United States Patent
Knaup

(10) Patent No.: US 11,054,337 B2
(45) Date of Patent: Jul. 6, 2021

(54) METHOD FOR CONDUCTING A VIBRATION-DIAGNOSTIC MONITORING OF A MACHINE

(71) Applicant: Fibro GmbH, Weinsberg (DE)

(72) Inventor: Markus Knaup, Auenwald (DE)

(73) Assignee: Fibro GmbH, Weinsberg (DE)

( * ) Notice: Subject to any disclaimer, the term of this patent is extended or adjusted under 35 U.S.C. 154(b) by 305 days.

(21) Appl. No.: 16/111,436

(22) Filed: Aug. 24, 2018

(65) Prior Publication Data

US 2018/0364132 A1 Dec. 20, 2018

Related U.S. Application Data

(63) Continuation of application No. PCT/EP2017/056791, filed on Mar. 22, 2017.

(30) Foreign Application Priority Data

Mar. 31, 2016 (DE) ...................... 10 2016 105 877.7

(51) Int. Cl.
*G01M 13/028* (2019.01)
*G01M 13/045* (2019.01)
*G05B 19/406* (2006.01)
*G05B 23/02* (2006.01)
*G01H 1/00* (2006.01)

(52) U.S. Cl.
CPC .......... *G01M 13/028* (2013.01); *G01H 1/003* (2013.01); *G01M 13/045* (2013.01); *G05B 19/406* (2013.01); *G05B 23/0235* (2013.01); *G05B 2219/37435* (2013.01); *G05B 2219/37534* (2013.01)

(58) Field of Classification Search
CPC .............. G01M 13/028; G01M 13/045; G05B 19/406; G05B 19/4065; G05B 23/0235; G05B 2219/37435; G05B 2219/37534; G05B 2219/37252; G01H 1/003
See application file for complete search history.

(56) References Cited

U.S. PATENT DOCUMENTS

| 3,748,896 A | 7/1973 | Barrows |
| 2003/0066352 A1* | 4/2003 | Leamy ..................... G01H 1/08 73/593 |

(Continued)

FOREIGN PATENT DOCUMENTS

| DE | 197 02 234 | 8/1998 |
| DE | 602 21 149 | 3/2008 |

(Continued)

OTHER PUBLICATIONS

Ulrich Klein: "Schwingungsdiagnostische Beurteilung von Maschinen und Anlagen", Verlag Stahleisen GmbH, Düsseldorf, 2, Auflage, 2000, Seiten 5-15, 17-24, 69-88, 89-112, 153-169. ISBN 3-514-00663-6.

(Continued)

*Primary Examiner* — Manuel L Barbee
(74) *Attorney, Agent, or Firm* — Harness, Dickey & Pierce, P.L.C.

(57) ABSTRACT

A method and a device for carrying out a method for conducting vibration-diagnostic monitoring and assessment of individual machine parts (M1, . . . Mn) of a machine (M), preferably a rotating machine, using a frequency analyzer.

14 Claims, 8 Drawing Sheets

(56) References Cited

U.S. PATENT DOCUMENTS

| | | | |
|---|---|---|---|
| 2004/0030524 A1 | 2/2004 | Jarrell et al. | |
| 2008/0027659 A1* | 1/2008 | Miyasaka | G01H 1/00 702/39 |
| 2015/0134271 A1 | 5/2015 | Ikejiri et al. | |
| 2015/0160101 A1* | 6/2015 | Gao | E21B 41/00 702/6 |

FOREIGN PATENT DOCUMENTS

| | | |
|---|---|---|
| EP | 1 081 567 | 3/2001 |
| EP | 1 338 873 | 8/2003 |

OTHER PUBLICATIONS

German Search Report for corresponding Application No. DE102016105877.7, dated Nov. 16, 2016.
International Search Report for PCT/EP2017/056791, dated May 26, 2017.

* cited by examiner

METHOD FOR CONDUCTING A VIBRATION-DIAGNOSTIC MONITORING OF A MACHINE

CROSS-REFERENCE TO RELATED APPLICATIONS

This application is a continuation of International Application No. PCT/EP2017/056791, filed Mar. 22, 2017, which claims priority to German Application No. 10 2016 105 877.7, filed Mar. 31, 2016. The disclosures of the above applications are incorporating herein by reference.

FIELD

The disclosure relates to a method and a device for carrying out a method for conducting vibration-diagnostic monitoring and assessment of individual machine parts such as bearings, gear assemblies, motors, an alignment or imbalance and similar characteristics of machines, processing or handling devices, or equipment such as a machine tool or parts of a machine tool such as a rotary table, wherein especially intermittently operating machines such as an indexing table can be analyzed.

BACKGROUND

In the prior art, various methods are already known to perform diagnoses and predictions with regards to manufacturing machines or production facilities. The system availability of a machine such as a rotary table is an important factor for the economic use of this facility.

The main object of a method for monitoring the state specifically of rotating or rotatable machines is to facilitate the assessment of the current condition of a machine, of the load on the machine, and of any changes in the condition of the machine without interrupting its operation, if possible. Condition of a machine in this context means the evaluation of the technical condition of the machine based on the aggregate of the current readings of all vibration amplitudes and operating parameters.

The availability of production facilities can be improved through preventive maintenance and empirical data, which simultaneously reduces the downtime of the facilities and their maintenance costs. The downside of this approach is that it is rarely possible to make accurate predictions about the condition and the time of failure of machine parts, bearings or parts subject to wear and tear. Furthermore, preventive maintenance commonly results in the replacement of parts with a long remaining service life.

An alternative form of maintenance is represented by condition-based maintenance. Condition-based maintenance requires the reliable and regular assessment of the condition of the machine. The measurement and evaluation methods, which have been developed for this purpose and which are available according to the prior art, serve to monitor and evaluate process parameters and machine parameters such as temperature, pressure, torque or electric current data. Vibration analysis also is frequently used to diagnose machines. By employing such an analysis, it is possible to detect and diagnose defects in their early stages to avoid consequential damages.

For example, methods are known for monitoring/evaluating continuously moving and/or rotating machine parts, in particular of machine bearings, by analyzing vibration patterns. The vibration monitoring systems required for this process measure the vibrations of a machine rotating for a longer period of time, and, for example, send out an immediate error alert when a threshold level of the aggregate vibration level is exceeded.

Intermittent sequences of movements are such movements of machines, which only cover a certain path of movement, for example, the rotation a rotary table by an angle of 30°, 45°, 90°, 120° and similar angles. This could also refer to the stroke of a press, for example, which differs from that of a punching die, that continuously or over a longer period of time performs a multitude of strokes per minute. In general terms, an intermittent movement is a movement pattern, that includes only a few cycles or less than one cycle of a repeated movement. The movement of a continuously moving or rotating machine can be characterized by a ratio such as revolutions per minute, strokes per minute or similar indices. The movement of such machines usually occurs over a plurality or multitude of contiguous movement phases.

An intermittent movement therefore also is that movement, which is characterized by a multitude of movement phases. These phases are not contiguous but are separated by a pause in movement.

The disadvantages of the method described above are that it only detects the mere fact of a parameter's threshold being exceeded and that it is difficult to assess the cause for the altered vibration pattern. The suspected cause of an error alert often is difficult to connect with the actual cause.

Such simple parameters of the vibration signal therefore are not reliable indicators for the condition of parts and bearings in a machine, and certainly offer no basis for forecasts. Complex machines, that include multiple rotating components and drives in close proximity, can hardly be monitored in any targeted fashion in this way. Furthermore, it is desired to diagnose early indicators of errors expected to occur in the future, but these diagnoses are not possible with such a method.

The expected condition of a machine operating with intermittent movement cannot be determined with the methods known in the art. Due to the complex movement pattern, the known forecasting methods cannot be applied to relatively short phases of movement.

The correlation between vibration patterns of the intermittently moving machine and its operating parameters cannot be determined using the method known in the prior art. Furthermore, a large number of parameters are required to define the vibration parameters occurring during the various operating states, resulting in a large amount of data and a considerable volume of calculations and analyses.

SUMMARY

Based on the prior art, it is an object of the disclosure therefore is to overcome the aforementioned disadvantages and to provide a simpler, less-complex and more-reliable method for monitoring machine characteristics and, in particular, to achieve an improved assessment of the current and the future conditions of a machine, that can be applied to intermittently moving machines, in particular to indexing tables.

SUMMARY

This object is achieved by the characteristics listed in claim 1.

The inventive method for vibration-diagnostic monitoring of an intermittent movement makes it possible to automatically determine dependencies of the vibrations for certain operating parameters and to indicate these dependencies for the respective machine. The disclosure can be used to particular advantage in machines rotating by a certain angle, such as rotary indexing tables. The capture of the vibration pattern and the analysis of the individual contributions of various machine parts to the complex vibration of the machine as a whole provide targeted information on the causes of the vibrations and the changes within their patterns.

The disclosure provides a method in where the complex measured vibration pattern is subjected to spectral analysis such that the vibrations attributable to a specific machine part to be monitored can be extracted from the overall vibration pattern. Thus, the disclosure makes it possible to monitor a multitude of machine parts simultaneously with just one sensor, but nonetheless to specifically assign changes in the complex measured signal to a specific machine part such as a roller bearing or a gear assembly.

A preferable first option for analyzing and forecasting is the use of reference models. This is explained in more detail below, using the example of an unbalance (eccentricity). For the purpose of the case of application, a reference model is designed corresponding to movements dependent on the angle of rotation or clocked intermittent movements. The reference model with the vibrational peaks (Pi) of a frequency curve is expressed in a function of the form $f(P1) = \alpha P1 + \beta$ for each peak P, in order to analyze these peaks by means of regression analysis techniques. The corresponding value $V_{EXT}$ for the respective unbalance therefore corresponds to the result of the factor $\alpha$ P1, that represents the influential factor of the variables, and the factor $\beta$, that corresponds to a disturbance variable. The correlation between the value ($V_{EXT}$) and the respective individual peak Pi of the frequency curve is plotted in a graph, for example, or stored in a dataset. Due to the influence of speed, position, temperature and other variables, a value ($V_{EXT}$) is obtained for each influential factor. The validated model can be used for forecasting. Often, a confidence interval is included along with the forecast value to gauge the uncertainty of the forecast.

It is particularly advantageous to divide the intermittent movement into multiple, preferably three, movement phases. Specifically, an acceleration phase from the idle state until a constant speed is reached, a constant phase (where the speed of the movement remains constant or nearly constant) and a deceleration phase, that extends from the time the speed is reduced until the system comes to a stop.

In another advantageous embodiment of the disclosure, the movement phase is analyzed—regarding analysis and specifically frequency analysis—using partial FFT analyses (Fourier analyses). Each phase (acceleration, constant phase and deceleration phase) is analyzed separately and independently of the respective subsequent phase, which decreases computing time and computing capacity.

Another preferred embodiment of the disclosure uses multivariate analysis. Here, the techniques of control networks are applied to the complex movement pattern of an intermittent movement by using so-called "fingerprints." First, a set of fingerprints is created, which are prepared for each desired rotation angle and each clock pulse. The fingerprint shows a very specific behavior for each movement pattern, which is determined by means of multivariate analysis, and which is stored as a "fingerprint" in a reference data memory. Thus, a fingerprint can be compared to the actual data in operation to obtain an assessment forecasting the future. A fingerprint can be created from an imbalance occurrence, a crash case, an overload or the degree of the overload etc., and the operating state can be compared with the specific frequency patterns, particularly with those present in the different phases of movement.

It is particularly advantageous to calculate a Fourier series on the complex vibration pattern and to attribute the individual vibration components to the parts of the machine to be monitored.

For this purpose, the contribution of an individual component to the complex vibration pattern may be determined using a programming procedure described below. Once the target-value or model data are generated via this procedure, deviations in the complex vibration patterns can be attributed to the individual machine components, preferably by a Fourier series expansion.

The present disclosure therefore proposes a method for the vibration-diagnostic monitoring and assessment of individual parts of a machine and their condition, using at least one vibration sensor, and preferably using additional sensors; the method comprising the following steps:

a) intermittently or continuously measuring and capturing at least one sensor signal, preferably a time signal x(t) of the vibration of the machine (M) during intermittent movement, using a vibration sensor (10);

b) evaluating the sensor signal or signals;

c) comparing the sensor signals with target-value data, model data and/or reference data of individual machine parts (M1, . . . Mn);

d) providing evaluative information and/or an alert for the respective machine parts (M1, . . . Mn), as soon as a deviation of the currently measured vibration data from the target-value data or model data is detected, or a deviation forecast by extrapolation is detected during the capture during the intermittent movement.

Alternatively or additionally, the following method steps can be conducted according to the disclosure:

e) intermittent or continuous measuring and capturing of time signals x(t) of the (complex) vibration of the machine with a vibration sensor during an intermittent phase of movement of the machine or during a clocked operation, wherein the movement phase or the clock cycle comprise an acceleration phase, a constant phase and/or a deceleration phase;

f) evaluating the time signal x(t) assessed for the partial phases by means of frequency analysis, using an analyzer, preferably a frequency analyzer;

g) extracting a frequency spectrum y(f) with the discrete frequency peaks $y_m(f_m)$, wherein the frequency peaks $y_m(f_m)$ will be/are attributed to a specific machine part, respectively;

h) comparing the extracted frequency spectrum y(f) by means of a comparator with target-value data, model data and/or reference data, and i) providing evaluative information and/or an alert for the respective machine parts as soon as a deviation of the currently measured vibration data from target-value data or model data is determined.

The disclosure stipulates that threshold values are defined for each value captured by the sensors (such as temperature, pressure, vibration), at which the machine or device operates optimally. The trajectory of the individual values captured by the sensors is calculated by means of a forecast process such as 1st- to nth-order exponential smoothing. The forecast can be used to describe the future development of the time series. Thereby, the time of the occurrence and the severity of a possible error, if any, can be assessed or detected in advance. Additionally, the forecast quality can continually be improved by comparing the forecast values gained via the prediction method to the target/actual values.

For this purpose, variables or parameters can be stored in the forecast function, for example, that are initialized and can be adjusted regularly.

In another advantageous embodiment of the disclosure, individual phases of the movement of a device such as a rotary table are captured and analyzed. In the case of vibration analysis for intermittent movements, the individual vibration curves for a specific single or multiple clocked movement(s) of the rotary table can be assembled into a total curve and subsequently analyzed and projected out by the methods described above. To this end, a processor will assemble the individual curves into a total curve. This dataset is then processed further in the inventive manner; forecasting methods can subsequently be applied to these data as well.

Another aspect of the present disclosure relates to the correlation matrix between the values captured by the sensors and the combination of values. The input values captured by the sensors, their previously defined threshold values (target values) and the ideal operating points describe the state of the device, for example, the state of a rotary table. This state can be "taught," that is, programmed, as the operating points ideally suited to the work environment may be different from the initial settings. In addition, changes in operating parameters such as speeds and loads may result in different optimum operating conditions. To this end, a correlation matrix is created between the values captured by the sensors and the combinations of values. The goal is to provide information regarding the causes for certain combinations of values captured by the sensors and their exceeding the target values. According to the disclosure, the environmental conditions $Ub_1, \ldots, Ub_n$ define a state space for the sensory parameters. The permissible state space can be defined by a set of matrices $M_{ij}$, wherein captured deviations of single or multiple matrix elements within a captured matrix are compared with the permissible target values of the corresponding matrix from the set of matrices $M_{ij}$, and information is generated when a permissible deviation is detected, which is used for the regular adjustment of the previously stored matrices. Thus, the set of matrices $M_{ij}$ is adjusted dynamically in response to the environmental conditions, and improved forecasts regarding the occurrence of certain events or defects can be made more accurately. This "learning" system is therefore not characterized by static values (in particular, target values and forecast values) but dynamically adjusted values (target values and forecast values).

In an alternative, simplified embodiment of the present disclosure, the performance of and forecasts for a rotary table, for example, can be obtained from the measurement of its speed. As speed directly correlates to torque, conclusions can be drawn with regard to torque, for example, by measuring the speed at the output drive of the turntable (if the moment of inertia is known).

The measurement can be conducted intermittently or continuously. For intermittent measurement and data capture, vibration measurement series can be conducted in certain predefined intervals for a predefined time. Thus, the vibration pattern of a rotary table can be monitored during a certain machining process, for example, every x hours for the duration of the respective process. Capturing the time signal x(t) therefore also captures the vibration amplitudes for a particular period of time. The complex vibration curve thus obtained is disaggregated into its vibration components at a specific frequency in the frequency range y(f) via the spectral analysis of $x(t) \rightarrow y(f)$, where f is the frequency and t the time. Using Fourier transform, for example, these components can form the basis for a frequency analysis, such that certain frequency peaks at certain frequencies are revealed to be significant, these being attributable to a particular machine part such as the rotary plate, the drive's cylindrical cam, the gear assembly, a particular roller bearing, etc.

The attribution of the frequency peaks, and in turn also of the vibration components of the complex vibration patterns, can be achieved, e.g., by manual changes in the natural frequencies, such as by attaching one or more resonators or resonant bodies locally onto a specific machine part, such that the change in vibration before and after attachment of the resonator can be detected. Thus, the component of the complex vibration graph attributable to the respective machine part can directly be made visible. This also makes it possible, for example, to detect the vibration pattern of individual defective parts of a machine, which are then stored in the programming mode of the machine or in a memory. Of course, any other suitable method to selectively allocate the vibration amplitudes to the machine parts via spectral analysis of the complex vibration pattern can be used.

Basically, the programming mode (or initial-capture mode) allows the user to determine the contribution of the individual machine parts to the total vibrations of the system and to store the results thus obtained in a memory.

It also is advantageous to capture the vibration pattern of the machine (M) and its parts (M1, ..., Mn) for at least one operating mode of the machine over a defined time period, to extract target-value data and/or model data for individual machine parts (M1, ..., Mn) from this pattern via an analysis with an analyzer, preferably a series expansion, and to store these data in a memory (S).

Accordingly, in one embodiment of the disclosure, vibration patterns (model data) or reference data are captured for the specific machine parts to be monitored. This data is then associated precisely with the machine parts. It is particularly advantageous to provide a visualization level for the visualization of the model data. The data can be displayed on a screen, thus visually assigning the spectral vibration components extracted by the vibration analyzer to the machine components.

Another aspect of the present disclosure relates to hardware implementation and software implementation. To implement the hardware, conventional computing and storage devices may be used, which may receive data via an interface and feed the data to an output device via the same or another interface. These computing and memory devices preferably may be integrated into the hardware of the spectrum analyzer.

The software of the analyzer is designed such that it can determine the complex-valued frequency spectrum from a vibration signal. Since a spectrum analyzer generally cannot produce a temporal relationship to a reference phase and to the measured signal and its phase position, it is advantageous to design the disclosure such that it only determines the intensity of the frequency spectrum, the so-called amplitude spectrum.

A measuring method such as FFT Fourier analysis (Fast Fourier Transform) can be used. Depending on the machine type and complexity of the vibration signal, signal amplifiers, bandpass filters and the like also may be used to process the measured signal.

The software implementation can be realized via one or more specific applications, which calculate a frequency spectrum from the complex vibration patterns via a machine part-specific spectral analysis, wherein the spectral lines are attributed to specific machine parts. Additionally, it is advantageous to implement an algorithm for the individual calculation tasks in the hardware.

Any data protocol suitable in this context may be used.

In another advantageous embodiment of the disclosure, the visualization level may be integrated in the hardware of the analyzer.

After extracting a frequency spectrum, a comparison of the extracted frequency spectrum $f(\omega)$ can be conducted via a comparator with target-value data, model data and/or reference data. An assessment regarding the actual data and, even more advantageously, a forecast of a future condition can be derived from the result.

A preferred embodiment of the disclosure therefore stipulates that the time differential or the first derivative with respect to time of the vibration signal captured during the measurement, or a measured parameter derived from the same, is used to prepare a forecast of the future condition of one or more of the respective machine parts or their performance, preferably at a certain time in the future.

In other words, meaning:

As long as the machine is operating without malfunctions, no unbalances are present, parts subject to wear and tear are not appreciably worn and no damage to the bearings is present, the measured vibration pattern matches the pattern captured during the programming mode and/or the stored target data for the machine, that were stored as reference data or model data.

As soon as damage with increasing extent develops in a bearing of the machine, the complex vibration pattern changes. However, prior to a failure of the machine, a targeted assessment can be made for the part of the machine being monitored via the aforementioned analysis of the change in the complex vibration pattern, to the effect that the change in the vibration component, or a change in amplitude at a specific frequency, can be attributed to the respective part. Furthermore, assessments regarding the current and future condition can be made on the basis of a targeted evaluation of the manner, extent and speed of the change of the vibration component within the complex vibration pattern. This allows not only for the early detection of the pending machine malfunction but also for the allocation of the pending or imminent malfunction to a specific machine part or machine state.

Another advantageous embodiment of the disclosure therefore provides for the use of the time derivative of the time signal $x(t)$ or the frequency spectrum $f(\omega)$ between two or multiple subsequent measurements to forecast the condition of one or more of the respective machine parts (M1, . . . , Mn) or their performance. It is particularly advantageous in this context to disaggregate the measured vibration signal via a transform, preferably a Fourier transform into a series, preferably a Fourier series.

A further development of the concept provides for the specification of few or a single threshold value(s) during the evaluation of the relative deviation of the vibration parameters for the individual operating states, wherein a weighting parameter is attached to the threshold value depending on the quantitative contribution to the vibration amplitude or the quantitative contribution to the amplitude of the corresponding frequency according to the Fourier analysis. An initial alert or information output is only conducted when weighted threshold value has been reached.

Another aspect of the present disclosure relates to a device for performing a method as described above for the vibration-diagnostic monitoring and assessment of individual machine parts (M1, . . . , Mn) of a machine. A vibration sensor is to be attached to the machine for intermittently or continuously measuring and/or capturing a time signal $x(t)$ of the vibration of the machine. Also, attached is a vibration analyzer for analyzing the time signal and a comparator for comparing the current measurement data or data derived from the same with stored target-value data, model data and/or reference data or correlation data.

It is advantageous when a memory is arranged in the device to store target-value data, model data and/or reference data, which correspond to the vibration characteristics of the machine and its parts (M1, . . . , Mn) when functioning properly. Furthermore, discrete-time or time-stamped data, specifically correlation data, can be captured and stored in the memory.

In an alternative embodiment, the device may be provided with an active or passive resonator, which can be attached locally to various parts of the machine for active or passive modification of the vibration of the machine. This is particularly advantageous for machines with weak vibration signals, as the machine can be brought into a vibrating state with an active resonator. In this context, it is advantageous if the resonator runs through amplitude bands and/or frequency bands in order to suitably excite the vibrations.

Alternatively, for example, a passive resonator can be used for attachment to a tool holder. The data resulting from this vibration modification provide information with regards to the local contribution of a machine part to the overall vibration pattern.

The captured data or calculated arrays of curves of the vibration modifications yield a model data set, that can be used to clearly attribute deviations in the vibration of the machine during subsequent operation to individual machine parts.

In another advantageous embodiment of the disclosure, the hardware implementation and software implementation for conducting the aforementioned method is arranged in a single unit jointly with the vibration sensor or integrated in the vibration sensor.

The device may furthermore advantageously comprise the following components:
- a data processing unit (base unit) with n input interfaces for connecting external sensors and m output interfaces for making a connection to a controller, a cloud or an output unit and/or
- a preferably time-stamped memory for data integration and/or
- a hardware-implemented application software for capturing and processing measurement data and for creating correlation data between the target and actual conditions and/or
- other sensors for capturing environmental parameters and machine parameters such as the ambient temperature and the temperature of the machine and/or
- status control elements for visually capturing statuses such as LED lights.

The present disclosure is explained in more detail using the example of vibration-diagnostic monitoring of a motor-driven device. Other advantageous developments of the disclosure are characterized in the dependent claims and/or are described below in more detail with the aid of drawings along with the description of the preferred embodiments of the disclosure.

DRAWINGS

The drawings described herein are for illustrative purposes only of selected embodiments and not all possible implementations, and are not intended to limit the scope of the present disclosure.

DETAILED DESCRIPTION

Figure 1:
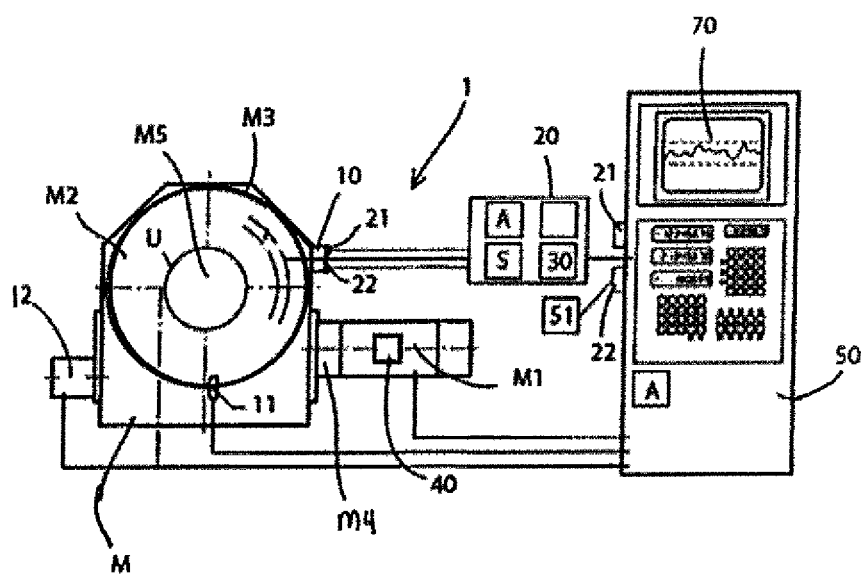
FIG. 1 is a diagrammatic view of a machine with the machine components and the vibration sensor.

In the following, the disclosure is explained in more detail with reference to FIGS. 1 to 11. Identical reference numerals indicate identical structural and/or functional characteristics.

FIG. 1 shows a diagram of a machine M (here, a rotary table) with the components M1, ..., M5 and a device 1 with a vibration sensor 20 for measuring vibration.

Figure 2:
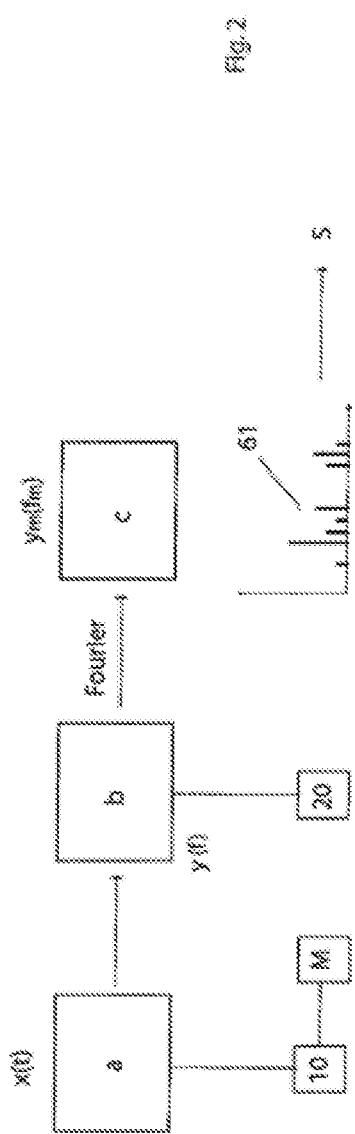
FIG. 2 is a representation of a capture phase in a block diagram.
Figure 3:
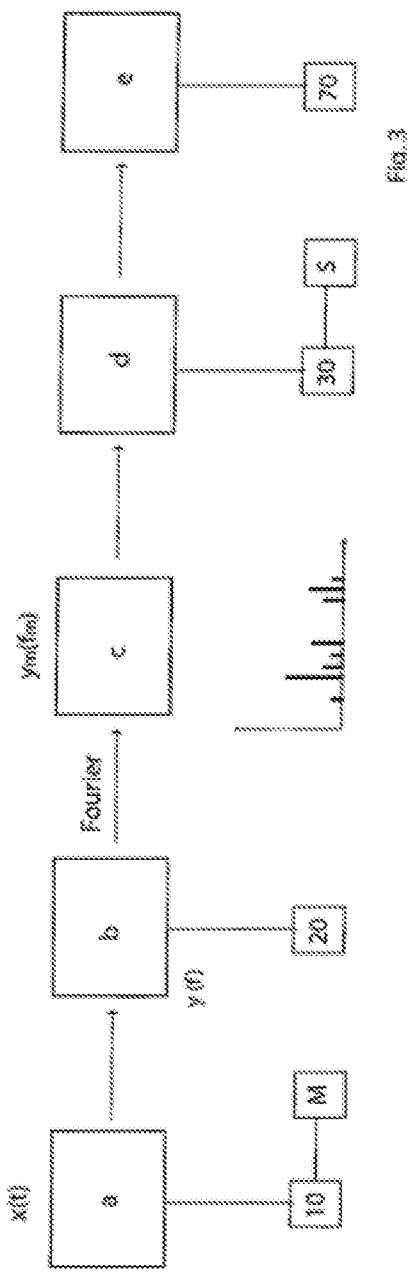
FIG. 3 is a representation of the monitoring phase in a block diagram.

The device 1 is designed to execute the method for the vibration-diagnostic monitoring and assessment of the individual machine parts M1, ..., M5 of a machine M, as represented in FIGS. 2 and 3, via a block diagram.

Figure 4:
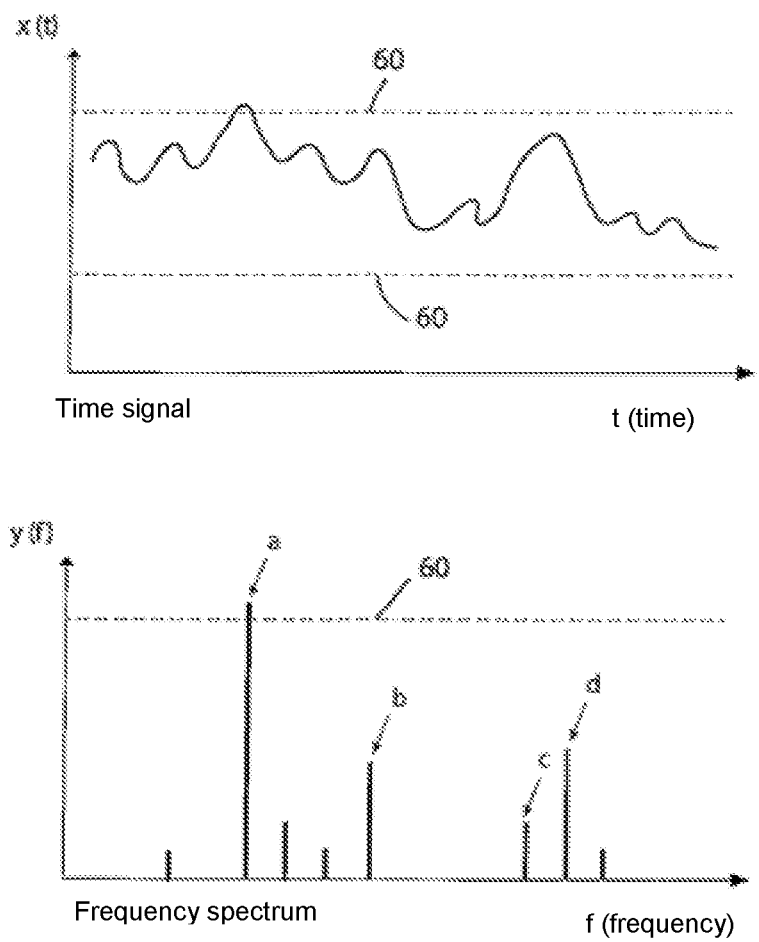
FIG. 4 is a complex vibration curve with the allocation to the machine parts.

A vibration sensor 10 for intermittently or continuously measuring and/or capturing a time signal x(t) is arranged on the machine M, as exemplarily shown in FIG. 4. Furthermore, other sensors (such as a temperature sensor, etc.), which are not shown here, may be provided.

The vibration of the machine M is captured by the vibration sensor 10 during operation of the machine M in this embodiment.

Furthermore, a vibration analyzer 20 is provided for analyzing the time signal. The vibration analyzer 20 includes a hardware-implemented application, that alternatively may also be included in the sensor 10 or the data processing device 50. Furthermore, a comparator 30 is included for comparing the current measurement data as shown in FIG. 4 or data derived from the same (in this case, the frequency spectrum, as shown in the lower view of FIG. 4 and FIG. 5) with stored target-value data 60, model data 61 and/or reference data 61. In a particularly advantageous embodiment, the target-value data is stored as a complete state space (preferably as a set of matrices) in a target-value memory.

The memory S is used to store and recall the target-value data 60, model data 61 and/or reference data 61 from a comparator. Advantageously, the comparator is designed such that it may compare not only individual sensor data with stored target-value data, but a multitude of data such as data captured by multiple sensors depending on the respective operating and environmental parameters, such that this dataset may be compared with a stored data set. Thus, a whole series of data, in particular machine-part-specific data may be compared with the model data. The model data correspond to the proper vibration characteristics of the machine 10 and its parts M1, ..., M5 during normal operation free of malfunction in a specific operating state, as seen in the top view of FIG. 5, for example.

Furthermore, the following components are provided advantageously in the exemplary embodiments, in particular in the embodiment shown in FIG. 1:

a data processing unit 50;
input interfaces 21 for connecting external sensors and output interfaces 22 for making a connection to a controller 51, a cloud or an output unit;
a preferably time-stamped memory S for data integration and reading out target-value data;
a hardware-implemented application software A for capturing and processing measurement data and for preparing correlation data between the target and actual conditions;
a visualization level 60;
a reference switch 11 and a measurement system 12 for the rotary table;
a forecasting module, which can determine forecast data for future time points t from the actual data via an extrapolation method.

Figure 5:
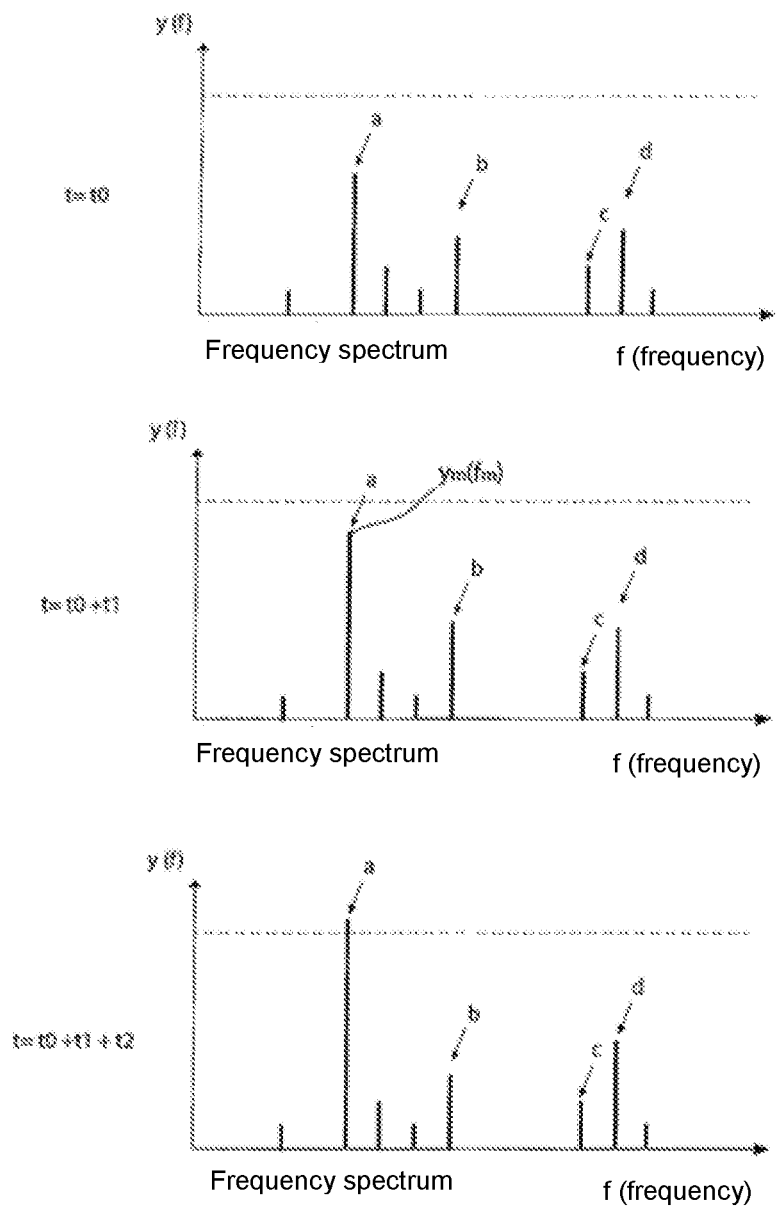
FIG. 5 is a representation of frequency spectra at different points in time t.

As visible in FIG. 5, the drawing at the top shows a frequency spectrum with spectral lines at discrete frequencies. The spectral line (a) results from the bearing M3, while the spectral line (b) characterizes an imbalance U. The spectral line (c) results from the motor M1. The spectral line (d) from the plate M2 of the rotary table 10. Another spectral line results from the gear assembly M4. The measurement is performed at a start time t=t0.

This state is intended to represent the normal operation, during which each of the amplitudes of the individual spectral lines in the frequency band are below a defined target value represented by the dashed target-value curve 60 for the spectral line (a). Essentially, individual target-value curves 60 can be defined respectively for all machine parts M1, ..., M5 and their associated spectral lines. Deviations based on changes in performance can be detected by shifts in the spectral lines or by changes in the amplitude.

FIG. 2 is a block diagram of a capture phase for determining the vibration components of the machine parts M1, ..., M5 during normal operation free of malfunctions. In step a), a measurement is taken with a vibration sensor 10, thus capturing a vibration signal, namely a time signal x(t) of the vibration of the machine M. Additionally, the entire state space for various or specific environmental conditions U1, ..., Un can be captured and the captured datasets can be stored in matrices. Thus, the respective appropriate data matrix can be used as a reference target-value matrix dependent on the environmental conditions.

In step b), an evaluation is performed of the time signal x(t) or, respectively, of the sensor data of the captured sensor values. The time signal x(t) is analyzed by means of a frequency analysis using a frequency analyzer 20. The analyzer 20 determines a frequency spectrum y(f) with the discrete frequency peaks $y_m(f_m)$. The frequency peaks in each case are assigned to a specific machine part M1, ..., M5 (step c).

The data thus obtained are stored in the memory S in step d). This measurement result is shown in the top diagram in FIG. 5 at the time t=t0 of the time signal.

If a state space is captured and calculated for multiple sensors monitoring various machine parts and machine parameters, a multi-dimensional state space with state values for regular operations without malfunction would result, as would space ranges, inside which measurements represent an impermissible change of the performance of a specific machine part or a specific parameter.

During the operation of the machine M, the method is conducted as shown in the block diagram of FIG. 3. This includes the aforementioned steps a), b) and c), conducted as discrete-time sequences or continuously (for example, with a time stamp), and the step d), that is, the comparison of the extracted frequency spectrum y(f) via a comparator 30 with the stored target-value data 60 or the model data 61.

During a further step e), status information is processed and/or provided and, if necessary, an alert for the respective machine parts M1, . . . , M5 is sent out as soon as a deviation of the currently measured vibration data from the target-value data 60 or model data 61 is detected. Additionally, it is preferable to also conduct an extrapolation of the measured values into the future with conventional extrapolation methods, wherein, according to the disclosure, the extrapolation curve is adjusted regularly via time-delayed dynamic corrections of the extrapolation curve based on the comparison between actual data and extrapolated data. For this purpose, the parameters of the underlying extrapolation curve or the curve itself can be adjusted to match the actual behavior. This results in consistently improved target-value matrices or target-value data with regards to subsequent forecasts, as the extrapolation curves thus prepared reflect the actual and forecast behavior of a machine under certain environmental conditions with consistently improved precision.

The middle and lower diagrams of FIG. 5 show exemplary (cumulative) deviations of the error-free vibration in comparison to the top diagram in FIG. 5. It is apparent that the amplitude of the spectral line a markedly increased at the time t=t0+t1 after the operating time t1, although it still lies below a maximum target value 60, which is represented by the dashed target-value line. The lower target-value line 60 represents a first threshold, any exceedance of which is detected as a deviation, which is permissible until a deviation exceeds the second upper target-value line 60. When the upper threshold is exceeded, an impermissible operating state is present. The deviation range 71 between the two target-value lines 60 is a band defining the allowable deviations from a theoretically exact curve.

In the bottom diagram of FIG. 5, the amplitude of the spectral line a at the time t=t0+t1+t2 after the operating time t1+t2 is increased even more and is now above the second (maximum) target value 60. The spectral line a is associated with the bearing M3 and indicates increasingly severe bearing damage. A forecast time, at which the bearing is expected to have to be replaced, can be defined based on the temporal differential of the amplitude peaks of the spectral lines a.

It is particularly preferable if the data processing system 50 is connected via an interface to an inventory management system, automatically reports the need for a replacement part to that system, examines the inventory of existing parts and, if necessary, triggers a purchase order to procure the replacement part, such as a specific bearing.

The spectral line b also increases with increasing operating time, which is due to an increasing imbalance U at the mass M4 of the rotary plate.

In the embodiment depicted in FIG. 1, an active resonator 40 is provided in addition, which can be locally attached to various parts of the machine M for actively modifying the machine vibration of that part.

Figure 6:
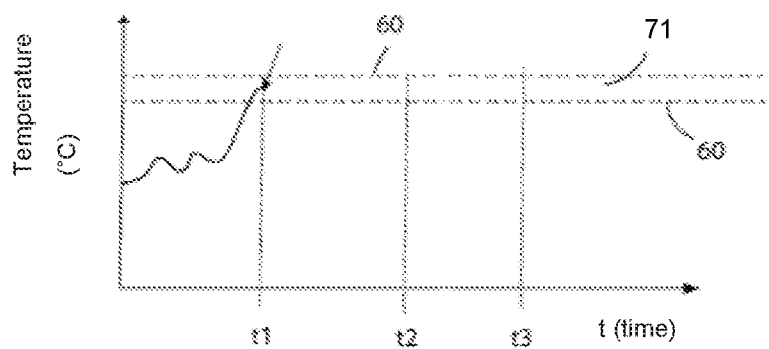
FIG. 6 is a temperature curve with a permissible deviation band.

FIG. 6 shows an exemplary temperature curve (T in ° C.) plotted against the time t, which has been captured by a temperature sensor of a device, as well as a permissible deviation range 71 (between the dotted target-value lines 60) for still-permissible temperatures. At the time $t_1$, the temperature T rises to a value, which still lies within the deviation band. After an allocation of the deviation, the analyzer determines that the temperature increase indicates a specific machine part, for example a bearing. As the measured temperature T has not left the permissible band, a conventional method comprising only temperature monitoring would not be able to make any assessment regarding the affected machine part nor any assessment for the future. Using the present method, a forecast curve can be calculated from the previously obtained data (as exemplarily shown in FIG. 7). This forecasts the curve's trajectory for future times based on an extrapolation. In this context, it is to be assumed that the bearing will fail at the time t3, at which time the temperature will rise significantly.

Figure 7:
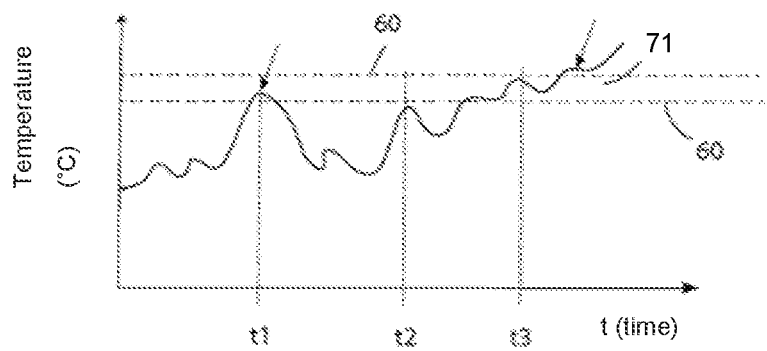
FIG. 7 is a forecast curve derived from the temperatures shown in FIG. 6 as a continuation of the current measurement curve.
Figure 8:
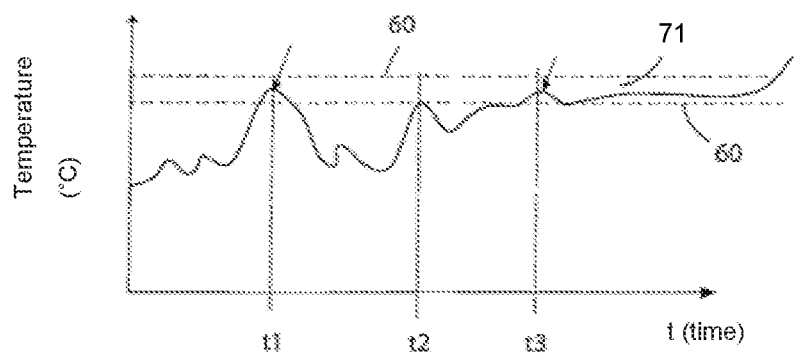
FIG. 8 is a forecast curve created from the forecast curve in FIG. 7 that was improved by considering additional actual conditions subsequently determined in comparison to the forecast curve.

FIG. 8 shows a forecast curve created from the forecast curve in FIG. 7, which was improved by considering additional actual conditions at a time t2, t3, . . . , tn, which were determined at a time subsequent to the curve in FIG. 6 by comparing the respective forecast curve to the actual trajectory. It is apparent that the curve exits the deviation range at a later time than the originally projected time t3. It is therefore apparent that the bearing damage only started at the time t1, when a significant temperature increase was detected for the first time, and was not yet advanced at that time. Based on these findings, the repair and maintenance can be planned much better and the bearing life can be optimized, because the bearing would not be replaced too early due to the captured data.

Figure 9:
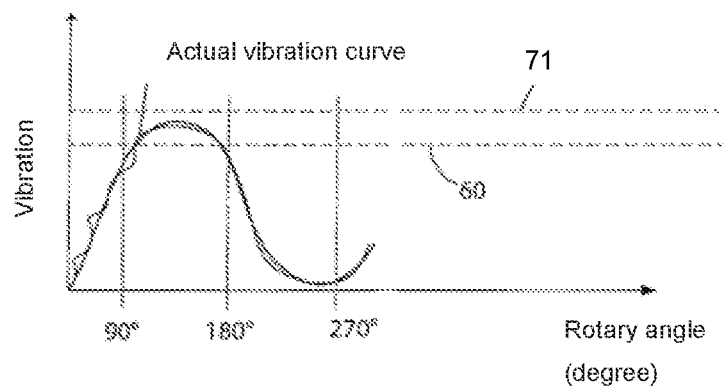
FIG. 9 is a representation of a composite measurement curve obtained from curve portions per clock cycle.

FIG. 9 shows a representation of a composite measurement curve, which was generated from curve components per clock cycle of a rotary table. As each clock phase includes an accelerated phase with a deceleration phase, it is possible to generate a composite curve from the individual movement paths. Furthermore, a deviation range 71 is calculated or defined again for each parameter from the target-value data in the state space of permissible records, as in the exemplary embodiments described above. As long as the curve representing the acceleration and deceleration phases lies within the values of the status matrix, which comprise a deviation range 71 for this parameter, the state is recognized as a "permissible operating state." A forecast curve can be extrapolated from the past values and the respective current measurement values within the deviation band can (as explained above), which provides information on how the movement curve will develop in the future.

Figure 10:
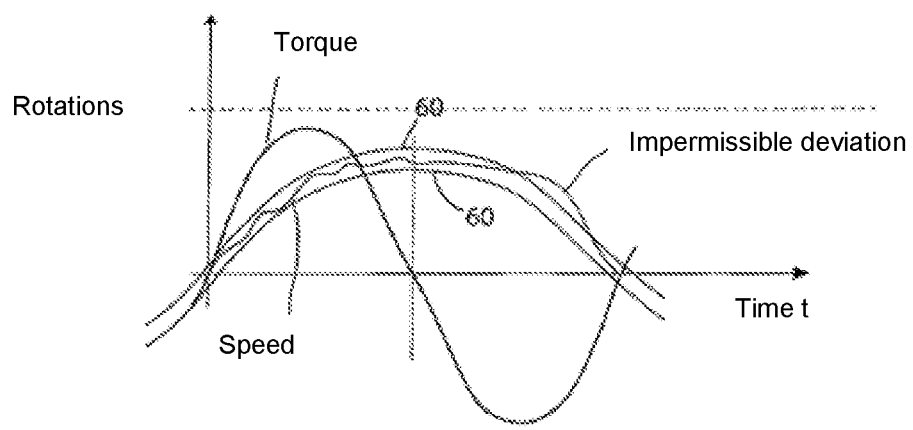
FIG. 10 are measurement curves of a rotary table with permissible deviation band.

FIG. 10 shows the curve trajectory of the movement of a rotary table from the acceleration phase I up to the plateau II, during which the speed is at a maximum, after which the speed decreases again in the deceleration phase III until it reaches "zero," that is, until the rotary table comes to a stop.

The graph also shows the time derivative, that is, a curve proportional to the torque M, which initially increases up to a maximum value, then decreases to "zero" and then becomes negative.

A deviation range 71 is drawn around the idealized torque curve. As the torque is linked with the angular acceleration via the moment of inertia, corresponding target curves can be determined for the individual moments of inertia, which are in effect for a rotary table during processing; these target curves can be compared with the captured speed curves. The speed curve or, respectively, the acceleration then directly provides information regarding the torque.

If, for example, the speed lies outside the permissible range in a specific angular position, for example in the deceleration phase III, conclusions can be drawn from the deviations about a malfunction in a specific machine part, if the state space for the individual components has been captured. An assessment regarding the "improperly" functioning machine part and its forecast behavior (especially in conjunction with the described extrapolation) can be made from the matrix element, by direct comparison of the deviation parameters with the target parameters.

The disclosure is not limited to the aforementioned preferred embodiments, regarding its implementation. Rather, a number of variants are conceivable, which make use of the described solution even in significantly different configurations.

Figure 11:
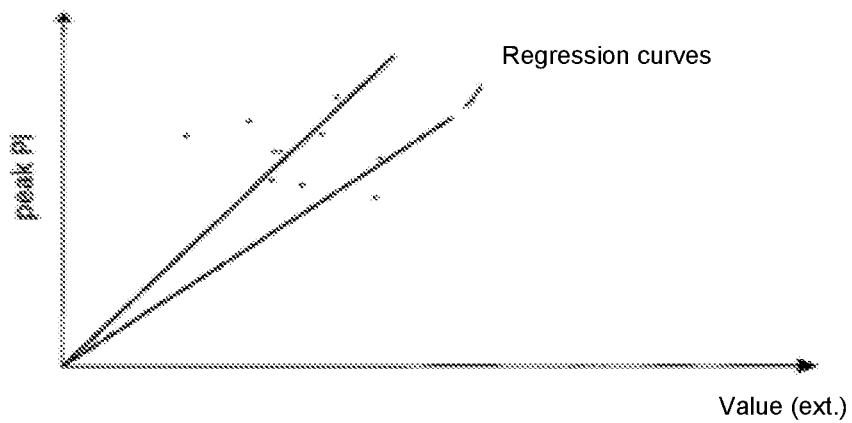
FIG. 11 is a representation of the correlation of parameters P that are associated with individual peak values of the frequency spectrum, which are shown via regression curves.

Thus, FIG. 11 shows a representation of the correlation of parameters P, which are associated with individual peak values of the frequency spectrum, and which are represented by regression curves. The use of reference models offers possible analyses and forecasts. This is explained in more detail in FIG. 12 using the example of an imbalance (eccentricity). A corresponding reference model is designed for the application of movements that are rotary-angle dependent or intermittently clocked. The reference model with the vibration peaks (Pi) of a frequency curve is expressed in a function of the form $f(P1)=\alpha P1+\beta$ for each peak P, in order to analyze these peaks via regression analysis techniques. If the deviations from the regression model curve (peaks Pi) become too large, a forecast can be concluded with regards to the machine part corresponding to the peak.

Figure 12:
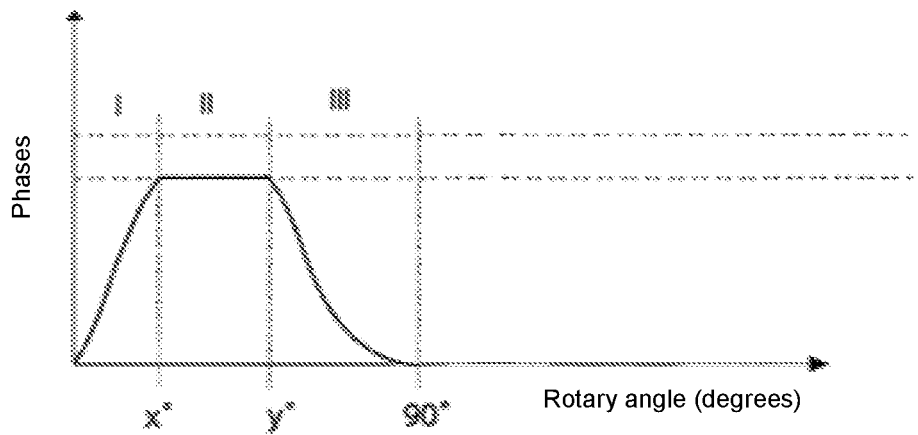
FIG. 12 is a diagram representing an intermittent movement by an angle of 90°.

FIG. 12 shows a diagram of an intermittent movement of a rotary table by an angle of 90° in three movement phases, namely Phase I (accelerating phase), Phase II (constant phase) and Phase III (deceleration to standstill).

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A method for the vibration-diagnostic monitoring and assessment of individual parts (M1, . . . Mn) of an intermittently moving or clocked machine (M) and their current and forecast condition, using at least one vibration sensor the method comprising the steps of:
   a) measuring and capturing at least a time signal x(t) of the vibration of the machine (M) during a movement phase of intermittent movement of this machine (M), using the vibration sensor;
   b) evaluating the time signal x(t);
   c) wherein evaluating the time signal x(t) includes evaluating the time signal x(t) by means of frequency analysis, using a frequency analyzer;
   d) extracting, from the frequency analysis, a frequency spectrum y(f) with the discrete frequency peaks ym(fm), wherein the respective frequency peak(s) ym(fm) are attributed to a specific machine part (M1, . . . Mn);
   e) comparing the frequency peaks ym(fm) of the frequency spectrum y(f) with target-value data, model data and/or reference data of individual machine parts (M1, . . . Mn); and
   f) providing evaluative information and/or an alert for the respective machine parts (M1, . . . Mn) as soon as a deviation of the respective frequency peaks ym(fm) data from target-value data or model data, or a deviation forecast via extrapolation, is detected,
   wherein a multitude of sensors are used for the sensor-diagnostic monitoring and assessment of various machine parameters, and wherein sensor data (S1, . . . ; Sn)(t), included in a data matrix $M_{ij}(t)$ comprising measurement data, are compared with the target values of a target-value matrix $Mtarget_{ij}$, t represents time; and wherein a deviation is assessed in terms of magnitude as soon as the deviation is detected at a time t; and wherein the sensor data (S1, . . . ; Sn)(t) from a subsequent measurement are again compared with the target-value data of the target-value matrix $Mtarget_{ij}$ and with previously measured sensor data; and wherein, should the deviation of one of the sensor data (S1, . . . ; Sn)(t) increase in magnitude, a curve trajectory is extrapolated via an extrapolation of the measured data, wherein this forecast curve can be used to derive a point in time, at which one of the sensor data (S1, . . . ; Sn)(t) will exceed a permissible deviation or leave a permissible tolerance range.

2. The method according to claim 1, wherein the movement phase or the clocked movement cycle of the machine is divided into at least three movement sub-phases, which represent an acceleration phase or constant phase, and wherein at least the evaluation of the steps c) and d) is conducted separately for the respective relevant periods of the movement sub-phases.

3. The method according to claim 1, wherein the sensor data from the vibration sensor is captured and the current frequency spectrum data are compared with the stored target-value data, wherein a deviation is assessed in terms of magnitude as soon as the deviation is detected at a time t; and wherein the sensor data from a subsequent measurement is again compared with the target-value data and with previously measured sensor data of the vibration sensor, wherein, should the deviation of the sensor data increase in magnitude, a curve trajectory is extrapolated via an extrapolation of the measured data, wherein this forecast curve can be used to derive a point in time, at which the sensor data will exceed a permissible deviation in magnitude or at which the data's values will leave a permissible tolerance range.

4. The method according to claim 1, wherein intermittent or continuous measuring and capturing of a vibration signal by means of the vibration sensor and/or of sensor data (S1, . . . ; Sn)(t) from one or all of the sensors is used to compare the trajectory of the extrapolated curve, or the extrapolated values from a previous extrapolation of one or all of the sensor data for which deviation values have been captured, with the currently captured data, and wherein, in the event that differences are present between the actual data and the extrapolated data corresponding to the actual data, an extrapolation curve and specifically adjusted parameters of the theoretical extrapolation curve are calculated, and wherein the parameters used to calculate the extrapolation function are adjusted such that improved forecast accuracy is achieved by conducting a new extrapolation of future sensor data with the newly calculated extrapolation function.

5. The method according to claim 1, wherein the method is executed during a movement cycle while the machine is in operation, or during an intermittent movement in a specific operating mode.

6. The method according to claim 1, wherein the measured vibration signal is disaggregated, via a transform.

7. The method according to claim 1, wherein the vibration pattern of the machine (M) and its parts (M1, ..., Mn) is captured for at least one operating mode of the machine over a defined time period, and wherein target-value data and/or model data for individual machine parts (M1, ..., Mn) are extracted from this pattern via an analysis with an analyzer.

8. A method for the vibration-diagnostic monitoring and assessment of individual parts (M1, ... Mn) of an intermittently moving or clocked machine (M) and their current and forecast condition, using at least one vibration sensor the method comprising the steps of:
- a) measuring and capturing at least a time signal x(t) of the vibration of the machine (M) during a movement phase of intermittent movement of this machine (M), using the vibration sensor;
- b) evaluating the time signal x(t);
- c) wherein evaluating the time signal x(t) includes evaluating the time signal x(t) by means of frequency analysis, using a frequency analyzer;
- d) extracting, from the frequency analysis, a frequency spectrum y(f) with the discrete frequency peaks ym(fm), wherein the respective frequency peak(s) ym(fm) are attributed to a specific machine part (M1, ... Mn);
- e) comparing the frequency peaks ym(fm) of the frequency spectrum y(f) with target-value data, model data and/or reference data of individual machine parts (M1, ... Mn); and
- f) providing evaluate information and/or an alert for the respective machine parts (M1, ... Mn) as soon as a deviation of the respective frequency peaks ym(fm) data from target-value data or model data, or a deviation forecast via extrapolation, is detected, wherein the time differential or the first derivative with respect to time of the vibration signal captured during the measurement, or of the measured parameter derived from the signal, is used to perform a forecast regarding the future condition of one or more of the respective machine parts (M1, ... Mn) or their performance.

9. A method for the vibration-diagnostic monitoring and assessment of individual parts (M1, ... Mn) of an intermittently moving or clocked machine (M) and their current and forecast condition, using at least one vibration sensor the method comprising the steps of:
- a) measuring and capturing at least a time signal x(t) of the vibration of the machine (M) during a movement phase of intermittent movement of this machine (M), using the vibration sensor;
- b) evaluating the time signal x(t);
- c) wherein evaluating the time signal x(t) includes evaluating the time signal x(t) by means of frequency analysis, using a frequency analyzer;
- d) extracting, from the frequency analysis, a frequency spectrum y(f) with the discrete frequency peaks ym(fm), wherein the respective frequency peak(s) ym(fm) are attributed to a specific machine part (M1, ... Mn);
- e) comparing the frequency peaks ym(fm) of the frequency spectrum y(f) with target-value data, model data and/or reference data of individual machine parts (M1, ... Mn); and
- f) providing evaluative information and/or an alert for the respective machine parts (M1, ... Mn) as soon as a deviation of the respective frequency peaks ym(fm) data from target-value data or model data, or a deviation forecast via extrapolation, is detected, wherein the time derivative of the time signal x(t) or of the frequency spectrum y(f) between two or more successive measurements is used to perform a forecast regarding the current and/or future condition of one or more of the respective machine parts (M1, ..., Mn) or their performance.

10. A method for the vibration-diagnostic monitoring and assessment of individual parts (M1, ... Mn) of an intermittently moving or clocked machine (M) and their current and forecast condition, using at least one vibration sensor, the method comprising the steps of:
- a) measuring and capturing at least a time signal x(t) of the vibration of the machine (M) during a movement phase of intermittent movement of this machine (M), using the vibration sensor;
- b) evaluating the time signal x(t);
- c) wherein evaluating the time signal x(t) includes evaluating the time signal x(t) by means of frequency analysis, using a frequency analyzer;
- d) extracting, from the frequency analysis, a frequency spectrum y(f) with the discrete frequency peaks ym(fm), wherein the respective frequency peak(s) ym(fm) are attributed to a specific machine part (M1, ... Mn);
- e) comparing the frequency peaks ym(fm) of the frequency spectrum y(f) with target-value data, model data and/or reference data of individual machine parts (M1, ... Mn); and
- f) providing evaluative information and/or an alert for the respective machine parts (M1, ... Mn) as soon as a deviation of the respective frequency peaks ym(fm) data from target-value data or model data, or a deviation forecast via extrapolation, is detected, wherein an active or passive resonator is provided, which can be attached locally to various parts (M1, ..., Mn) of the machine (M) for active or passive modification of the vibration of the machine, such that the modification of the vibration signal in its amplitude portion or frequency portion, or in a parameter derived from the same, results in the assignment of the vibration signal to a specific machine part (M1, ..., Mn).

11. A device for conducting a method for the sensor-diagnostic monitoring and assessment of individual machine parts (M1, ... Mn) of an intermittently operating machine (M),
wherein a vibration sensor is configured to be attached to the machine (M) for measuring and/or capturing a time signal x(t) of the vibration of the machine (M) with the vibration sensor during a movement phase of an intermittent movement of this machine (M), as well as a vibration analyzer for analyzing the time signal, and a comparator comparing the current measurement data derived from the same with stored target-value data, model data and/or reference data,
the method comprising:
- a) measuring and capturing at least a time signal x(t) of the vibration of the machine (M) during a movement phase of intermittent movement of this machine (M), using the vibration sensor;
- b) evaluating the time signal x(t);
- c) wherein evaluating the time signal x(t) includes evaluating the time signal x(t) by means of frequency analysis, using a frequency analyzer;
- d) extracting, from the frequency analysis, a frequency spectrum y(f) with the discrete frequency peaks ym(fm), wherein the respective frequency peak(s) ym(fm) are attributed to a specific machine part (M1, . . . Mn);
  e) comparing the frequency peaks ym(fm) of the frequency spectrum y(f) with target-value data, model data and/or reference data of individual machine parts (M1, . . . Mn); and
  f) providing evaluative information and/or an alert for the respective machine parts (M1, . . . Mn) as soon as a deviation of the respective frequency peaks ym(fm) data from target-value data or model data, or a deviation forecast via extrapolation, is detected,
 where an active or passive resonator is further provided that can be attached locally to various parts of a machine (M) for active or passive modification of the vibration of the machine.

12. The device according to claim 11, where memory is provided, in which target-value data, model data and/or reference data are stored, which correspond to the proper vibration characteristics of the machine and of its parts (M1, . . . , Mn) when no malfunction is present and/or to a state space of permissible machine parameters.

13. The device according to claim 11, wherein the hardware implementation and software implementation is arranged in a single unit jointly with the vibration sensor or integrated in the vibration sensor.

14. A device for conducting a method for the sensor-diagnostic monitoring and assessment of individual machine parts (M1, . . . Mn) of an intermittently operating machine (M),
  wherein a vibration sensor is configured to be attached to the machine (M) for measuring and/or capturing a time signal x(t) of the vibration of the machine (M) with the vibration sensor during a movement phase of an intermittent movement of this machine (M), as well as a vibration analyzer for analyzing the time signal, and a comparator for comparing the current measurement data or data derived from the same with stored target-value data, model data and/or reference data,
  the method comprising:
    a) measuring and capturing at least a time signal x(t) of the vibration of the machine (M) during a movement phase of intermittent movement of this machine (M), using the vibration sensor;
    b) evaluating the time signal x(t);
    c) wherein evaluating the time signal x(t) includes evaluating the time signal x(t) by means of frequency analysis, using a frequency analyzer;
    d) extracting, from the frequency analysis, a frequency spectrum y(f) with the discrete frequency peaks ym(fm), wherein the respective frequency peak(s) ym(fm) are attributed to a specific machine part (M1, . . . Mn);
    e) comparing the frequency peaks ym(fm) of the frequency spectrum y(f) with target-value data, model data and/or reference data of individual machine parts (M1, . . . Mn); and
    f) providing evaluative information and/or an alert for the respective machine parts (M1, . . . Mn) as soon as a deviation of the respective frequency peaks ym(fm) data from target-value data or model data, or a deviation forecast via extrapolation, is detected,
  wherein the following components are provided:
    a data processing unit with n input interfaces for connecting external sensors (S) and m output interfaces for making a connection to a controller, a cloud or an output unit and/or
    a time-stamped memory (S) for data integration and/or
    a hardware-implemented application software for capturing and processing measurement data and for preparing correlation data between the target and actual conditions and/or
    a forecast module, which is able to calculate forecast data for future time points t from the actual data by means of a functional extrapolation and/or
    an evaluation module for evaluating the actual data and/or the forecast data of the forecast module following the extrapolation in order to determine a time, at which one of the sensors will exceed a permissible deviation or exit a permissible tolerance range.

* * * * *